Oct. 25, 1966    C. F. REASER    3,281,164
TRAILER HITCH
Filed Nov. 2, 1964

INVENTOR.
CHARLES F. REASER
BY Schroeder, Siegfried
& Ryan
ATTORNEYS

United States Patent Office 3,281,164
Patented Oct. 25, 1966

3,281,164
TRAILER HITCH
Charles F. Reaser, 510 4th St. NE., Little Falls, Minn.
Filed Nov. 2, 1964, Ser. No. 408,207
8 Claims. (Cl. 280—501)

This invention is directed to trailer hitches for motor vehicles and more specifically to an improved trailer hitch having a fixed portion adapted to be permanently connected to the under and rear portion of a motor vehicle and a removable hitch member which is selectively mountable in the fixed portion in a position to project beyond the bumper of the motor vehicle with a suitable hitch part to effect connection with a trailer. In trailer hitches of this type, the removable portion of the hitch is disconnected from the fixed portion and stored so that no projecting parts of the hitch will be exposed beyond the bumper end of the motor vehicle when the hitch is not in use.

Trailer hitches of this general type have been known and are in use. These prior devices have been of the type which required partial disassembly of nut and bolt parts to disconnect the removal portion. Further, these parts were so located as to be relatively inaccessible to an operator in the disconnecting operation. Trailer hitches of this general type have also been unsatisfactory from the standpoint of failing to provide an operative connection between the fixed and removable trailer hitch part which had sufficient load carrying ability. In addition, such structures have previously been complex in nature and expensive to manufacture. The improved trailer hitch of the removable type of the present invention overcomes all of these difficulties. The latch connection between the fixed and removable parts of the trailer hitch provides large load carrying characteristics and the relatively snug fit between the parts eliminates noise and vibration in the hitch. In addition, the hitch is simple in design and may be readily connected and disconnected from a position behind the vehicle without inconveniencing the operator.

Therefore it is the principle object of this invention to provide an improved removable trailer hitch.

Another object of this invention is to provide a trailer hitch of this type which has maximum strength or great load carrying ability while being simple in design.

A still further object of this invention is to provide a removable trailer hitch which is readily connected and disconnected without inconvenience to the operator.

A still further object of this invention is to provide a simplified removable trailer hitch which is simple in design, economical to manufacture and readily usable.

Figure 1:
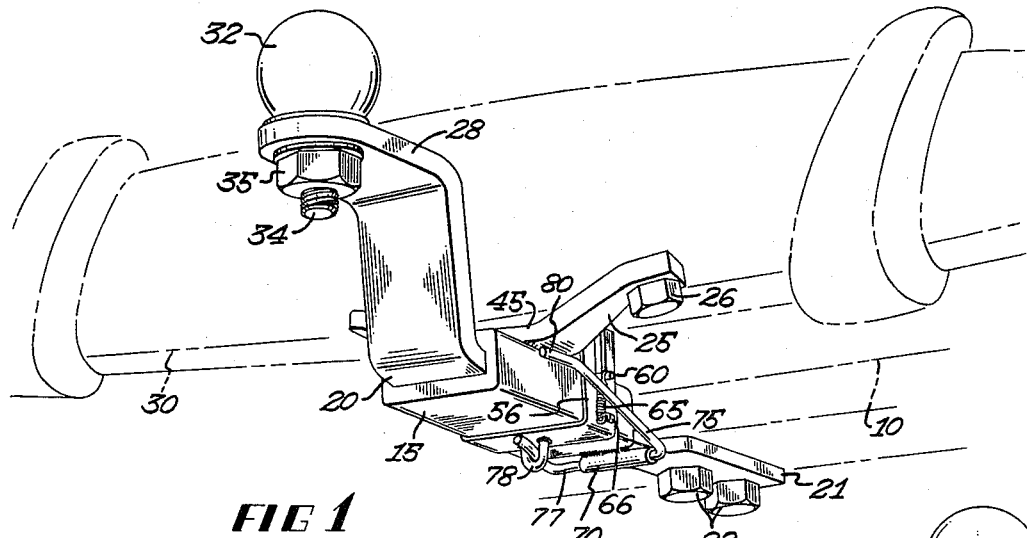
Figure 3:
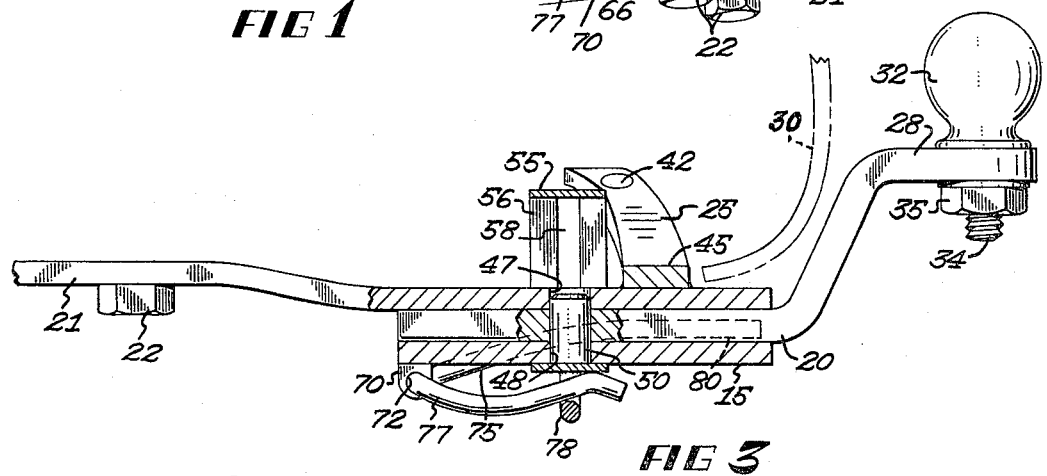
Figure 2:
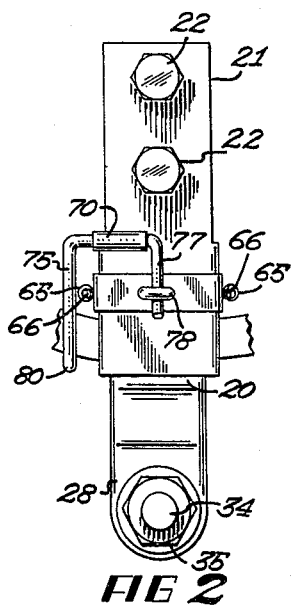
Figure 4:
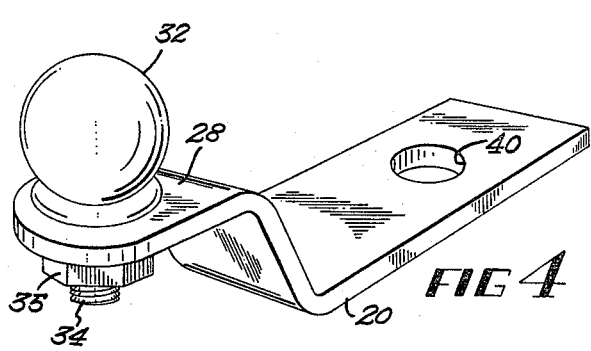

These and other objects of this invention will become apparent from a reading of the attached description together with the drawings wherein:

FIGURE 1 is a perspective view of the improved removable trailer hitch applied to an automobile, FIGURE 2 is a bottom view of the improved removable trailer hitch, FIGURE 3 is a side elevation view of the removable trailer hitch with parts sectioned, and FIGURE 4 is a perspective view of the removable portion of the improved trailer hitch.

My improved trailer hitch of the removable type is shown in assembled relationship in FIGURE 1, as applied to the undersurface of an automobile, indicated in part in phantom at 10, to disclose the application of the same. As will be seen in FIGURE 1, the improved removable trailer hitch includes basically a fixed tubular housing member 15, and a removable hitch part 20, with the housing member 15 including a flange extension 21 adapted to be attached to the undersurface of a vehicle through suitable means, such as bolts 22, at one extremity of the housing and with the opposite extremity of the housing including a transversely extending flange 25 similarly adapted to be connected to the undersurface of the vehicle, such as frame parts, through suitable securing means such as bolts 26. This portion of the removable trailer hitch is installed on a vehicle on the undersurface thereof in such a manner that the extremity of the tubular housing 15 does not project beyond the bumper portion, indicated in phantom at 30, of the vehicle. The removable trailer hitch member, as will be later noted, projects into the housing and is suitably secured therein with a portion of a hitch member extending beyond the tubular housing and being bent upwardly around the end surface of the bumper to terminate in a transversely extending flange portion 28 which mounts a conventional ball type hitch part 32 threaded through an aperture (not shown) in the transversely extending portion and being secured thereto by a nut 35 threaded on the threaded extremity 34 of the ball member 32.

The removable hitch part 20 is shown in perspective in FIGURE 4 as being generally an elongated flat or plate like member with the ball hitch portion 32 being mounted at one extremity thereof and with an aperture 40 located near the opposite extremity of the hitch member. The actual cross-sectional configuration or shape of the removable hitch member is not significant except that, as will be later noted, it is adapted to fit snugly within the tubular housing portion 15 or the stationary part of the hitch.

FIGURE 2 shows a bottom view of the hitch in an assembled relationship and FIGURE 3 is a side elevation view with parts in section to disclose the internal construction of the tubular member. Thus as will be seen in FIGURES 2 and 3, the tubular housing 15 does not extend throughout the extent of the fixed part of the trailer hitch but rather includes the flange portion 21 containing mounting apertures therein (not shown) through which the mounting bolts 22 secure this extremity of the fixed structure to the undersurface of the vehicle. A transversely extending flange 25 includes apertures 42 at the extremity thereof through which the mounting bolts 26 connect to a frame part of the undersurface of the vehicle for securing this extremity of the tubular housing 15 to the vehicle. The transversely extending flange is bent, as at 45, to space the housing from the under portion of the vehicle for purposes to be later noted. This part may be suitably secured to the tubular housing 15 through a means, such as welding. The cross-sectional configuration of the interior of the tubular housing is generally rectangular and of a slightly larger dimension than the plate like cross-section of the removable hitch member 20, such that the latter may be slidingly positioned into and out of the tubular housing. Housing portion 15 also includes aperture means 47 and 48 in the upper and lower surfaces thereof such that a connecting latch pin 50 may extend therethrough. The apertures 47, 48 and 40 in the removable hitch member are of the same diammetrical dimension and slightly larger than the diammetrical dimension of the latch pin 50 such that in the assembled relationship of the trailer hitch, the pin 50 may be inserted through these apertures and secure the removable hitch member or part 20 to the fixed portion or tubular housing 15 of the trailer hitch.

Pin 50 is mounted on a rectangular shaped latch frame 55, whose width dimension is slightly larger than the similar dimension of the tubular housing such that it fits around the tubular housing and may be slidably mounted thereon in a vertical direction. The height dimension as evidenced by the sides 56 of the latch frame is slightly less than the height dimension of the tubular housing plus the length of the pin 50. The sides 56 representing the height dimension includes slots 58 therein such that small projecting pins 60, on the upper surface of the tubular housing may be slidably mounted therein. The slots 58 and pins 60 form a guide for the latch frame 55 such that the latch frame may be slidably moved relative to the housing to insert and withdraw the pin 50 from the apertures 48 in the tubular housing. In the downward position of the latch frame 50, the pin is not completely withdrawn from the lower aperture means 48 but is clear of the opening therein such as to permit removal of the removable hitch member 20. In the raised position of the latch frame 55, the latch pin 50 is inserted through the aperture means 40 in the removable hitch member and extends up into the upper aperture means 47 in housing 15 to rigidly secure the removable hitch member 20 within the tubular housing. Latch frame 50 is biased to a raised position in which the pin 50 is inserted into the aperture 47 by means of a pair of coil springs 65 attached to one extremity of the ends of the pins 60 and at the other extremity to flanges 66 formed in the sides 56 of the latch frame adjacent the slots 58 therein. The springs are so dimensioned and connected between the tubular housing and the latch frame such that the latch frame will be biased to the upper position at all times.

Also mounted on the tubular housing is a cylindrical flange part 70 having an aperture 72 therein forming a bearing surface for a lever 75 which is generally "U" shaped in form. One extremity 77 of the lever 75 extends through a loop or "U" shaped connecting flange 78 attached to the bottom of the latch frame 55 while the other extremity 80 is bent slightly upward to be positioned along the side of the tubular housing 15 and provides a handle by means of which the lever may be rotated to urge the lever extremity 77 extending through the loop 78 in a rotative direction causing the latch frame 55 to slide on the guide pins 60 and move the latch pin 50 into and out of the apertures 47, 48 and aperture 40 when the removable hitch part 20 is positioned in the tubular housing 15. Lever 75 is normally utilized for moving the pin 50 downwardly out of the tubular housing and the bias springs 65 connected between the latch frame 55 and the tubular housing urge the latch frame and hence the pin upward into the tubular housing.

The improved removable trailer hitch of the present invention provides a relatively simplified structure by means of which the removable hitch part may be readily assembled and disassembled on a fixed part to place the trailer hitch in use or to store the projecting and unsightly portion of the hitch when it is not in use. This simplified structure provides for maximum strength of connection to provide for greater load hauling ability in as much as the connecting pin is placed in sheer stress between the parts. The undersurface of the trailer hitch exposed to the elements of the road either in the condition of usage with the removable hitch part assembled thereon or in the condition of non-usage when the removable hitch member 20 is removed therefrom presents a relatively smooth surface which is un-encumbered with projections to be susceptible to road damage or effected by an accumulation of mud and dirt therein. The raised portion of the latch flange is positioned against the undersurface of the automobile as determined by the bent portion 45 of the transversely extending flange 25 so that it is relatively protected against the accumulation of dirt and the like. Further, the pin 50 is normally positioned in the condition of usage of the hitch and non-usage of the hitch through both apertures 47 and 48 in the tubular member so that it will not be effected through exposure to elements. The lever member 75 has its extremities raised from a projecting position and is within the general profile or outline of the base of the hitch so that it presents no surface which can be damaged. The snug fit between the removable hitch portion 20 and the tubular housing 15 together with the pin connection therebetween in the assembled position, eliminates noise or vibration.

While I have shown the hitch parts with the latch pin projecting upwardly through the tubular housing, it will be well recognized that the pivotal mounting of the lever may be raised to the upper portion of the tubular housing if desired. This simplified structure provides a minimum of movable parts with a strong right connection between the parts of the trailer hitch to provide for rigidity and trouble free operation. Further, this simplified design makes the improved trailer hitch economical to manufacture and relatively maintenance free.

Therefore in considering this invention it should be remembered that changes may be made to the shape and location of the parts within the scope of the invention. Therefore the scope of the invention should be determined by the appended claims.

What is claimed is:

1. A trailer hitch comprising, a tubular housing having first and second means for attaching the housing to the rear portion of a vehicle on the undersurface thereof and forward of the rear bumper, an elongated removable hitch member having a cross-section symmetrical with and slightly less than the interior cross-section of the tubular housing, said elongated removable hitch member being adapted to be fitted into the tubular housing with a portion thereof projecting from a tubular housing and beyond the rear bumper, a ball type hitch flange positioned at the extremity of the exposed portion of said hitch member, a latch frame slidably mounted on the tubular housing and including a pin secured thereto, aperture means in the tubular housing and hitch member being aligned when the hitch member is positioned within the tubular housing and receiving said pin on the latch frame, bias means on the latch frame urging said latch frame to a position wherein said pin is inserted through the aperture means in the tubular housing and the hitch member, said latch frame encircling the tubular housing and having a dimension in the axial direction of said aperture in said tubular housing such that the latch frame member and the pin thereon secured to the inner surface of the latch frame is movable in said axial direction a distance substantially equal to the length of the pin, and means connected to the tubular housing for engaging the latch frame for overcoming the bias means and removing said pin from the aperture to permit removal of the hitch member from the tubular housing.

2. The trailer hitch of claim 1 in which the latch frame includes slotted sides and the tubular housing has pins projecting therefrom and positioned in slots in the latch frame to guide the latch frame for movement on the tubular housing.

3. The trailer hitch of claim 2 in which the bias means includes springs connected between the latch frame and the pins to bias the latch frame into a position where the pin thereon extends into and substantially through the tubular housing.

4. The trailer hitch of claim 3 in which the means connected to the latch frame and the tubular housing includes a lever pivoted on the tubular housing with one extremity connected to the latch frame for slidably moving the latch frame on the tubular housing through said slots and pins and in which the other extremity of the lever is free for manually pivoting thereof.

5. A trailer hitch comprising, a tubular housing having first and second means for attaching the housing to the rear portion of a vehicle on the undersurface thereof and forward of the rear bumper, an elongated removable hitch member dimensioned to fit into the tubular member with a portion thereof projecting from said tubular housing and beyond the rear bumper, a ball type hitch flange positioned at the extremity of the exposed portion of said hitch member, a latch frame slidably mounted on the tubular member and including a pin secured thereto, aperture means in the tubular housing and hitch member being aligned when the hitch member is positioned within the tubular member and receiving a pin on the latch frame, means positioned between said latch frame and said tubular housing for urging said frame to a position wherein the pin is inserted through the aperture means in the tubular member and the hitch member, said latch frame being a band member encircling said tubular housing with a depth dimension substantially twice the depth dimension of said tubular housing such as to be slidably positioned thereon in the depth direction and such that said pin mounted on said latch frame will extend through the aperture means in said hitch member when the latch frame is raised in the depth direction to one position and removed from the aperture means in said hitch member when the latch frame is moved in the depth direction to a second position when said hitch member is positioned in said tubular housing, and means connected to said tubular housing and engaging said latch frame for overcoming the urging means and removing the pin from the aperture means to permit removal of the hitch member from the tubular housing.

6. The tubular hitch of claim 5 in which the latch frame is guided on the tubular housing for movement in the depth direction by guide pins on the tubular housing fitted into slots in the latch frame along the surface thereof in the depth direction.

7. The trailer hitch of claim 6 in which the urging means for the latch frame includes springs attached between the guide pins and the latch frame to bias the latch frame to a position where the pin thereon is inserted through the aperture means in the tubular housing.

8. The trailer hitch of claim 7 in which the means connected to the latch frame and tubular housing includes a lever pivoted on the tubular housing and connected to the latch frame for slidably moving the latch frame on the guides formed by the pins and slots to selectively move the latch frame and pin thereon relative to the tubular housing such that the pin is removed from the aperture therein.

References Cited by the Examiner

UNITED STATES PATENTS

| 848,899 | 4/1907 | Hainsfurther | 24—206 |
| 2,569,086 | 9/1951 | Fenk | 280—495 X |
| 2,639,160 | 5/1953 | Studebaker et al. | 280—495 |
| 2,747,892 | 5/1956 | Jones | 280—495 X |

FOREIGN PATENTS 525,764 6/1956 Canada.

BENJAMIN HERSH, *Primary Examiner.*

C. C. PARSONS, *Assistant Examiner.*

UNITED STATES PATENT OFFICE
CERTIFICATE OF CORRECTION

Patent No. 3,281,164　　　　　　　　　　　　　　October 25, 1966

Charles F. Reaser

It is hereby certified that error appears in the above numbered patent requiring correction and that the said Letters Patent should read as corrected below.

Column 4, line 46, strike out "said pin from the aperture to permit removal of the hitch", and insert instead thereof, -- said pin from the aperture means to permit removal of the hitch. --.

Signed and sealed this 5th day of September 1967.

(SEAL)
Attest:

ERNEST W. SWIDER　　　　　　　　　　　　　EDWARD J. BRENNER
Attesting Officer　　　　　　　　　　　　　　Commissioner of Patents